(12) United States Patent
Herrmann et al.

(10) Patent No.: US 10,207,958 B2
(45) Date of Patent: Feb. 19, 2019

(54) METAL COATING ON CERAMIC SUBSTRATES

(71) Applicant: CeramTec GmbH, Plochingen (DE)

(72) Inventors: Klaus Herrmann, Thiersheim (DE); Roland Leneis, Marktredwitz (DE); Alfred Thimm, Wunsiedel (DE); Alexander Dohn, Memmelsdorf (DE)

(73) Assignee: CeramTec GmbH, Plochingen (DE)

( * ) Notice: Subject to any disclaimer, the term of this patent is extended or adjusted under 35 U.S.C. 154(b) by 149 days.

(21) Appl. No.: 14/895,782

(22) PCT Filed: May 14, 2014

(86) PCT No.: PCT/EP2014/059858
§ 371 (c)(1),
(2) Date: Dec. 3, 2015

(87) PCT Pub. No.: WO2014/195097
PCT Pub. Date: Dec. 11, 2014

(65) Prior Publication Data
US 2016/0115088 A1 Apr. 28, 2016

(30) Foreign Application Priority Data

Jun. 5, 2013 (DE) .................. 10 2013 210 455
Jun. 12, 2013 (DE) .................. 10 2013 210 959

(51) Int. Cl.
| C04B 41/88 | (2006.01) |
| C04B 41/51 | (2006.01) |
| C04B 41/90 | (2006.01) |
| C04B 41/89 | (2006.01) |
| C04B 41/00 | (2006.01) |
| C04B 41/52 | (2006.01) |
| C04B 41/45 | (2006.01) |
| C04B 111/00 | (2006.01) |

(52) U.S. Cl.
CPC ............ *C04B 41/88* (2013.01); *C04B 41/009* (2013.01); *C04B 41/4535* (2013.01); *C04B 41/4543* (2013.01); *C04B 41/51* (2013.01); *C04B 41/5111* (2013.01); *C04B 41/5127* (2013.01); *C04B 41/5144* (2013.01); *C04B 41/5177* (2013.01); *C04B 41/52* (2013.01); *C04B 41/522* (2013.01); *C04B 41/89* (2013.01); *C04B 41/90* (2013.01); *C04B 2111/00844* (2013.01)

(58) Field of Classification Search
CPC .................................................... C04B 41/88
See application file for complete search history.

(56) References Cited

U.S. PATENT DOCUMENTS

| 3,440,182 A | 4/1969 | Hoffman |
| 3,922,387 A | 11/1975 | Larry |
| 4,187,201 A * | 2/1980 | Hilson ............... H01B 1/16 106/1.13 |
| 4,323,483 A | 4/1982 | Rellick |
| 4,517,155 A | 5/1985 | Prakash et al. |
| 4,789,411 A * | 12/1988 | Eguchi ............... H01B 1/22 148/24 |
| 4,865,772 A | 9/1989 | Masatoshi et al. |
| 5,035,837 A | 7/1991 | Saeki et al. |
| 6,207,288 B1 | 3/2001 | Bloom |
| 6,855,399 B2 * | 2/2005 | Sumi ............... H01L 23/49883 252/512 |
| 7,704,416 B2 | 4/2010 | Inaba et al. |
| 7,897,066 B2 | 3/2011 | Inaba et al. |
| 8,043,536 B2 | 10/2011 | Inaba et al. |
| 2004/0070915 A1 * | 4/2004 | Nagai ............... C04B 35/62823 361/234 |
| 2009/0004369 A1 * | 1/2009 | Inaba ............... C03C 3/064 427/99.2 |
| 2011/0003145 A1 | 1/2011 | Herrmann |
| 2013/0186675 A1 * | 7/2013 | Takahashi ............ H05K 1/0306 174/253 |
| 2013/0228207 A1 * | 9/2013 | Wang ............... H01L 31/022425 136/244 |

FOREIGN PATENT DOCUMENTS

| CN | 101720311 | 6/2010 | |
| DE | 198 28 574 A1 | 12/1999 | |
| DE | 10 2009 001367 A1 | 9/2009 | |
| EP | 0 028 819 A1 | 5/1981 | |
| EP | 0 045 482 A1 | 2/1982 | |
| EP | 45482 A * | 2/1982 | ............ H01L 27/01 |
| EP | 0 425 073 A1 | 5/1991 | |
| GB | 2 018 035 | 10/1979 | |
| TW | 200919492 A | 5/2009 | |

OTHER PUBLICATIONS

Skriver, H. L., & Rosengaard, N. M., Physical Review B Condensed Matter, 46(11), (1992), 7157-7168.*
L. Vitos et al., Surface Science 411 (1998) 186-202.*
"Surface and Interface Physics," edited by Zhu Lvbing & Bao Xing, Tianjin University Press, Apr. 1992, p. 147.
Office Action issued in Chinese Patent Application No. 201480031821. X, dated May 9, 2018.

* cited by examiner

*Primary Examiner* — Vu A Nguyen
(74) *Attorney, Agent, or Firm* — Norton Rose Fulbright US LLP

(57) ABSTRACT

A method for producing metal coatings on ceramic substrates for establishing electrical contact, and ceramic substrates having metal coatings. More particularly, the invention relates to the production of weldable and solderable metal coatings on ceramic substrates.

16 Claims, No Drawings

METAL COATING ON CERAMIC SUBSTRATES

This application is a § 371 of International Application No. PCT/EP2014/059858 filed May 14, 2014, and claims priority from German Patent Application Nos. 10 2013 210 455.3 filed Jun. 5, 2013 and 10 2013 210 959.8 filed Jun. 12, 2013.

The invention relates to a method for producing metal coatings on ceramic substrates for establishing electrical contact, and ceramic substrates having metal coatings. In particular, the invention relates to the production of weldable and solderable metal coatings on ceramic substrates.

Active and passive electronic components which are mounted on ceramic printed circuit boards are usually soldered or welded to the printed circuit boards by means of soft solder. For this purpose, these components and the printed circuit boards must have solderable or weldable metals, which, for example, form alloys with conventional soft solders, in particular SnAgCu alloys.

Passive electrical components, such as coil bodies for example, comprise an insulating body (core) made from ceramic which is wound with a conducting metal wire, frequently made of copper. The electrical connection of the coil, that is to say of the conducting coil wire, takes place by means of a metal coating which is applied to the ceramic insulating body. Here, the metal coating is not only used for the electrical connection of the coil wire, but also for fixing the coil wire to the coil body. The coil wire is generally connected to the metal coating applied to the ceramic by means of friction welding. The electrical connection of the electronic components to a printed circuit board, for example, can also be made using the same metal coating.

The metal coatings on the electrical components and on the printed circuit boards must therefore contain solderable and/or weldable conducting metals such as copper, nickel, gold or silver.

However, the said metals, in particular metals which are good conductors and are easy to solder and/or weld, such as copper or nickel, do not adhere sufficiently well to ceramic substrates or do not form a solderable or weldable surface. If, for example, a nickel-glass metal coating is baked on at relatively low temperatures, the adhesion between ceramic and metal coating is not sufficient. If the nickel-glass metal coating is baked on at higher temperatures, the metal coating is "over-sintered". This "over-sintering" leads to the production of an irregular metal mesh which cannot be adequately well soldered or welded.

In order to achieve good solderability or weldability, a closed, sheet-like surface of the metal coating is aimed for. Using the said metals, such a metal coating cannot currently be achieved directly, i.e. without a succession of layers of different metals, which is laborious to produce.

Currently prevalent metal coatings have, for example, a succession of layers made from tungsten/glass, nickel, palladium and gold or also silver-palladium.

The tungsten/glass base metal coating serves to bond the metal coating securely to the ceramic. For this purpose, a metal-glass paste is applied to the ceramic, e.g. by immersion in the metal-coating paste or by means of screen printing. This paste must be baked on at temperatures greater than 1000° C.

However, tungsten is not a good electrical conductor and also cannot be soldered satisfactorily. Therefore, a chemical or currentless nickel layer, which is solderable and weldable, is applied in a next step. As nickel is not deposited directly on the tungsten layer by chemical galvanization, the tungsten layer must be seeded with palladium as a catalyst before the nickel is deposited.

If it is sufficiently thick, the nickel layer can be soldered or welded. If, however, finer copper, aluminum or gold wires are to be applied to the metal coating for the coil wire or as a connection to electronic components, or if an electrical connection is to be made by means of bonding, a gold coating must be additionally applied to the metal coating. As gold forms an alloy with nickel, a further layer of palladium can be provided between the nickel and the gold coating as a separating layer. The palladium layer also serves to provide protection against corrosion. As a rule, both the palladium and the gold layer are deposited by electrochemical galvanization or from currentless baths.

From these comments, it is clear that electrical connection on ceramic substrates by means of metal coatings is associated with many different steps, many different methods and expensive materials, in particular palladium, silver and gold.

On the one hand, the object of the invention is therefore to simplify the production of metal coatings on ceramic substrates and, on the other, also to reduce the production costs by avoiding expensive materials and by simplifying the method.

This object is achieved by a method and a product according to the characteristics of the independent claims. Accordingly, a method for producing an electrically conducting metal coating on ceramic substrates, wherein the metal coating is in direct contact with the ceramic substrate and is solderable and/or weldable, comprises the following steps:

a) Production of a metal-coating paste comprising at least one conducting, solderable and/or weldable metal;
b) Application of the metal-coating paste to the ceramic substrate;
c) Baking-on of the metal-coating paste.

Compared with the method known from the prior art, this method has the advantage that the electrically conducting, solderable and/or weldable metal coating can be applied directly to the ceramic substrate. According to the method known from the prior art, a layer of bonding agent, usually made of tungsten, must first be applied to the ceramic substrate, as electrically conducting, solderable and/or weldable metals are easily over-sintered or do not adhere sufficiently well to ceramic substrates. This applies particularly to the favorably priced and therefore frequently used nickel.

In addition, the invention also relates to ceramic substrates having an electrically conducting metal coating, wherein the metal coating is solderable and/or weldable. These ceramic substrates differ from the metal-coated substrates known from the prior art in that the metal coating is in direct contact with the ceramic substrate and is not applied to a base metal coating, for example made of tungsten.

In particular, oxide ceramics, such as $Al_2O_3$, $Al_2O_3$—$ZrO_2$, $Al_2O_3$—S, and also dielectric or magnetic materials, are possible ceramic substrates.

Particularly preferably, a metal-coating paste according to the invention is made up in such a way that a melt formed from the electrically conductive material or the melt formed from the electrically conducting material and the additives has a surface tension of less than 1.4 N/m, preferably less than 1.2 N/m and particularly preferably less than 1.0 N/m or less than 0.9 N/m.

In a similar way, the invention is particularly advantageous when conducting metals, the melts of which have a high surface energy, for example greater than 0.9 N/m, preferably greater than 1.0 N/m, particularly preferably greater than 1.2 N/m and in particular greater than 1.4 N/m, are to be used. These high surface energies can be reduced so that the metals better wet the ceramic and the glass which may be added to increase the adhesion. As a result, baking directly onto a ceramic substrate is a possible method for metal coating.

Wetting can be further improved by means of the baking-on atmosphere. By adding the smallest quantities of oxygen or water vapor, the formation of metal oxide can be encouraged and thereby the reaction with the ceramic intensified.

Preferably, at least one element of the transition elements VIIIB, in particular Fe, Co, Ni and/or Cu, is included as the at least one electrically conducting metal.

If these limits are maintained, metal coatings can be sintered directly onto the ceramic, as the problem of "over-sintering" of the electrically conducting material does not occur. The inventors have recognized that the phenomenon of over-sintering is associated substantially with the surface energy of the melt of the electrically conducting material. If this surface energy is high, as for example in the case of the frequently used nickel (surface energy of the melt: 1.77 N/m), the sintered electrically conducting material has a strong tendency to a reduction in surface area as an energetically favorable state. The consequence of this tendency is over-sintering of the material at temperatures which actually lie below the melting point of this material.

The surface energy of a material determines its wetting characteristics. At high surface energies, the wetting capability is poor and vice versa. For this reason, over-sintering can be prevented by reducing the surface energy of the metals to be applied.

According to a particularly preferred embodiment of the invention, the metal-coating paste comprises only the electrically conducting metal and the additives necessary for pasting, that is to say a pasting medium. As an example, the pasting medium can be a solution of 5 to 25% w/w ethyl cellulose in terpineol. The system comprising binding agent and solvent can, however, also comprise other (common) components such as polyvinyl butyral or polyacrylates with Texanol, butyral carbitol, etc., preferably with a portion of 5 to 25% w/w.

As an example, this embodiment of the invention is possible for pure copper metal coatings. In comparison to a nickel melt, for example, a copper melt has a low surface energy which is of the order of 1.36 N/m. As a result, the surface energy is so low without further additives that copper powder only has to be pasted with appropriate additives and can be baked on.

This is different in the case of nickel. The surface energy of a nickel melt is 1.77 N/m and is therefore too high to be able to form a solderable and/or weldable layer directly on the ceramic substrate without further additives. It is therefore necessary to add additives in order to reduce the comparatively high surface energy of a nickel melt.

A particularly preferred embodiment of the invention therefore provides that the additives are chosen accordingly such that a melt comprising the mixture of the at least one electrically conducting metal and the additives has a lower surface energy than a melt which consists only of the electrically conducting metal.

A further preferred embodiment provides at least one element of the transition groups IVB, VB, VIB, in particular Ti, Zr, W and/or Al and/or compounds thereof such as crystalline or vitreous oxides, nitrides, borides, carbides or compounds with mixed anions such as carbonitrides, as additives.

Particularly preferably, these additives can be metals, in particular metals which produce alloys with the electrically conducting metal or metals. Particularly preferably, the metals are chosen from Cu, Fe, Ti, Zr, W and/or Al. The alloys can reduce the surface energy in that the additive or additives break up the inner structures of the melt of the electrically conducting material which are responsible for the high surface energies. The cohesion forces in the melt are reduced. The relationship between the surface energies and the alloy can be estimated using the Butler equation.

According to a further preferred embodiment of the invention, crystalline or vitreous oxides, carbides, nitrides, borides or carbonitrides, which are dissolved or at least finely dispersed in the melt of the electrically conducting metal, can also be used as additives.

The oxidation or nitration of metals, for example, can also advantageously take place during the baking-on process in that said process is carried out under a defined atmosphere, e.g. under $N_2$ gas or with moist air. This enables metals to be used which initially alloy with the electrically conducting metal and therefore contribute to a reduction in the surface energy. As oxidation or nitration continues, the metal oxide or the material nitride then undertakes the role of the metal as an additive, thus enabling a synergy effect to be achieved here.

Examples of such compounds without restricting generality are: TiN, ZrN, ZrC, $ZrB_2$, TiCN. The important thing is that the compounds have good wettability for the electrically conducting metal so that the cohesion of the melt can be overcome by wetting.

A further preferred embodiment of the invention provides for the addition of bonding agents to the metal-coating paste. If glasses are used, on the one hand, these can improve the adhesion, that is to say fulfill their function as a bonding agent, and, on the other, also contribute to a reduction in the surface energy of the melt of the electrically conducting metal. This applies particularly to oxidic glasses such as $SiO_2$, $Bi_2O_3$, ZnO, alkali metal oxides or oxides from the main group III or mixtures of these compounds.

The metal-coating paste can be applied to the ceramic substrate using different methods. Immersion in the metal-coating paste, for example for terminations of U-shaped coil bodies, is preferred. Screen printing or pad printing methods, spraying or similar methods are suitable rather than for applying metal coatings to printed circuit boards or other ceramic substrates of any shape, in particular flat substrates.

A major advantage of the metal-coating pastes presented here is the low baking-on temperatures compared with the baking-on temperatures of the conventional tungsten base metal coating. Preferably, these lie between 800 and 900° C. and particularly preferably between 830 and 870° C.

After the metal-coating paste has been baked on, a further layer can be applied over the electrically conducting metal coating. If, for example, a particularly thick nickel coating which can be easily welded is present, a further currentless nickel coating can then be applied. If the baked-on metal coating is already made of nickel as the conducting metal, in contrast to the prior art no prior seeding with palladium as a catalyst is necessary, as currentless nickel can be deposited directly on a nickel-containing layer. On the one hand, this avoids the expensive raw material Pd and, on the other, the process step of immersion in a Pd-salt solution.

If required, silver or gold can also be galvanically deposited on the metal coating without any problems.

The invention is explained in more detail below with reference to examples.

Basically, a metal coating made of copper or nickel which is bonded to the base ceramic by means of inexpensive vitreous crystalline oxides is optimal with regard to conductivity and weldability or solderability. However, particularly when nickel is used, there is the problem of rapid and powerful sintering, which is a consequence of its high surface energy of 1.77 N/m.

On the other hand, copper has a surface energy of only 1.36 N/m, as a result of which copper metal coatings can also be baked directly onto ceramic substrates with and without bonding agents. However, if the metal coating is ferromagnetic, the addition of an appropriate metal is necessary. This increases the surface energy of the copper melt. Such a metal coating cannot be baked on without an energy-reducing additive.

High surface energies, particularly of nickel but also of ferromagnetic metal alloys, must be reduced in order to stave off the tendency to surface area reduction. For binary systems, the BUTLER equation gives the relationship between the surface energies of the elements and the alloy.

A binary alloy of 60% w/w copper with 40% w/w iron has, for example, a surface energy of only 1.22 N/m, although the surface energy of both metals lies considerably above this value. Copper has a surface energy of 1.36 N/m and iron as much as 1.92 N/m. The surface energy of the alloy can be reduced even further by the addition of aluminum with a surface energy of 0.50 N/m. Even adding iron to the nickel can easily reduce its surface energy by 2%.

The tendency to surface area reduction (="over-sintering") can also be prevented by adding separating particles such as metal compounds with lower surface energy and/or poor wettability such as oxides, nitrides, carbides and borides. Compounds of nickel (such as NiO) or copper (such as $Cu_2O$, which in glasses or in substance improves both the adhesion with copper and with ceramics) or glasses (such as $SiO_2$—$ZnO$—$B_2O_3$ or $MnO$—$SiO_2$—$Al_2O_3$) which also improve the adhesion with ceramic can be used for this purpose.

Moreover, further metals can be added to the nickel as electrically conducting metal, for example Ti, Zr, Fe or W, in elementary form or as a compound. When sintered onto the ceramic, an alloy is formed with the Cu or Ni, i.e. with the electrically conducting metal.

By a suitable choice of reaction gas ($N_2$, moisture), compounds such as TiN or FeO, which inhibit over-sintering of the nickel and improve adhesion with the ceramic, can also be produced from the additives.

EXAMPLES

A U-shaped oxide-ceramic coil body is metal-coated by immersing the ends in a paste made of Ni, Fe, Cu and possibly further materials and also glass. By way of example, the metal-coating paste can have the following composition: 50% w/w Ni, 0 to 20% w/w Fe and/or 0 to 20% w/w Ti and/or 0 to 20% w/w Al, 10 to 20% w/w Cu and/or 0 to 20% w/w CuO and/or 0 to 20% w/w $Cu_2O$, 10% w/w of a $MnO$—$SiO_2$—$Al_2O_3$ glass.

In the exemplary embodiment, the paste comprises 50% fine nickel powder (d50=5 μm), 20% iron powder (d50=5 μm), 20% copper powder (d50=5 μm) and 10% of a glass powder MnO (50% w/w)-$SiO_2$ (40% w/w)-$Al_2O_3$ (10% w/w, in each case referred to the total mass of glass), pasted in a solution of 10% w/w ethyl cellulose in terpineol, with a viscosity of 30 Pa*s.

The copper powder can partially or completely be replaced by copper oxide, CuO or $Cu_2O$.

The iron can partially or completely be replaced by titanium powder and/or aluminum powder.

In a further example, the metal-coating paste is produced from a mixture of Ni, W, W(VI) oxide and glass and the pasting medium described above. 70% w/w Ni, 15% w/w W, 5% w/w W(VI) oxide and 10% w/w glass as a powder (d50=5 μm) are mixed together and pasted on. The glass has the composition 50% w/w MnO, 40% w/w $SiO_2$ and 10% w/w $Al_2O_3$. The metal-coating paste is sintered on for 30 min at 1100° C. in moist hydrogen with a dew point of 20° C.

A mixture of $ZnO$—$SiO_2$—$B_2O3$-$Al_2O3$-$TiO_2$—$ZrO_2$ can also be used as the glass powder, for example: 35% w/w ZnO, 35% w/w $SiO_2$, 20% w/w $B_2O_3$, 5% w/w $Al_2O_3$, remainder $TiO_2$ and $ZrO_2$.

The invention claimed is:

1. A method for producing an electrically conducting metal coating on ceramic substrates, wherein the metal coating is in direct contact with the ceramic substrate and is solderable and/or weldable, the method comprising the steps of:
   a) producing a metal-coating paste comprising at least one metal selected from the group consisting of a conducting metal, a solderable metal and weldable metal;
   b) applying the metal-coating paste to the ceramic substrate;
   c) baking-on of the metal-coating paste;
   wherein the metal coating does not contain a noble metal selected from the group consisting of platinum, gold, palladium and silver, wherein the metal-coating paste further comprises at least one additive, wherein the additive comprises an element of the transition groups IVB, VB and VIB of the periodic table.

2. A method for producing an electrically conducting metal coating on ceramic substrates, wherein the metal coating is in direct contact with the ceramic substrate and is solderable and/or weldable, the method comprising the steps of:
   a) producing a metal-coating paste comprising at least one metal selected from the group consisting of a conducting metal, a solderable metal and weldable metal;
   b) applying the metal-coating paste to the ceramic substrate;
   c) baking-on of the metal-coating paste;
   wherein the metal coating does not contain a noble metal selected from the group consisting of platinum, gold, palladium and silver, wherein the metal-coating paste further comprises at least one additive, wherein the additive comprises at least one member selected from the group consisting of Ti, Zr, W and Al, or compounds thereof.

3. A method for producing an electrically conducting metal coating on ceramic substrates, wherein the metal coating is in direct contact with the ceramic substrate and is solderable and/or weldable, the method comprising the steps of:
   a) producing a metal-coating paste comprising at least one metal selected from the group consisting of a conducting metal, a solderable metal and weldable metal;
   b) applying the metal-coating paste to the ceramic substrate;
   c) baking-on of the metal-coating paste;
   wherein the metal coating does not contain a noble metal selected from the group consisting of platinum, gold, palladium and silver, wherein the metal-coating paste further comprises at least one additive, wherein the metal-coating paste further comprises a glass.

4. A method for producing an electrically conducting metal coating on ceramic substrates, wherein the metal coating is in direct contact with the ceramic substrate and is solderable and/or weldable, the method comprising the steps of:
  a) producing a metal-coating paste comprising at least one metal selected from the group consisting of a conducting metal, a solderable metal and weldable metal;
  b) applying the metal-coating paste to the ceramic substrate;
  c) baking-on of the metal-coating paste;
  wherein the metal coating does not contain a noble metal selected from the group consisting of platinum, gold, palladium and silver,
  wherein the metal-coating paste further comprises an oxidic glass.

5. The method according to claim 3, wherein the glass comprises at least one member selected from the group consisting of $SiO_2$, $Bi_2O_3$, ZnO, $TiO_2$, MnO, an alkali metal oxide and an oxide from the main group III of the periodic table.

6. The method according to claim 2, wherein the metal-coating paste comprises a pasting medium which is a solution of 5 to 25% w/w a) ethyl cellulose in either terpineol or polyvinyl butyral; or a polyacrylate in either Texanol or butyl carbitol.

7. The method according to claim 2, wherein the application of the metal-coating paste to the ceramic substrate is carried out by immersing the substrate in the metal-coating paste or by applying the metal-coating paste by means of a screen printing or pad printing method or by spraying.

8. The method according to claim 2, wherein the baking-on is carried out at a temperature between 800 and 900° C.

9. The method according to claim 2, wherein the baking-on is carried out in a gas atmosphere.

10. The method according to claim 2, wherein a further layer comprising Ni, or Au, is applied over the electrically conducting metal coating.

11. The method according to claim 2, wherein the metal coating comprises at least one conducting metal selected from the group consisting of iron, cobalt and nickel.

12. The method according to claim 3, wherein the metal coating comprises at least one member selected from the group consisting of iron, cobalt, nickel and copper.

13. The method according to claim 3, wherein the metal coating further comprises a member selected from the group consisting of Ti, Zr and W, or a compounds thereof.

14. The method according to claim 3, wherein the glass is selected from the group consisting of $SiO_2$, $Bi_2O_3$, ZnO, $TiO_2$, an alkali metal oxide and an oxide of the main group III of the periodic table, or mixtures of these compounds.

15. The method of claim 3, wherein the metal is selected from the group consisting of Ni and Cu.

16. The method according to claim 15, wherein the metal is Ni.

* * * * *